(12) United States Patent
Lin et al.

(10) Patent No.: US 9,166,848 B2
(45) Date of Patent: Oct. 20, 2015

(54) FREQUENCY-SHIFT KEYING RECEIVER

(71) Applicant: National Chi Nan University, Puli, Nantou (TW)

(72) Inventors: Yo-Sheng Lin, Nantou (TW); Chien-Chin Wang, Nantou (TW); Chien-Yu Li, Nantou (TW)

(73) Assignee: NATIONAL CHI NAN UNIVERSITY, Puli, Nantou (TW)

( * ) Notice: Subject to any disclaimer, the term of this patent is extended or adjusted under 35 U.S.C. 154(b) by 0 days.

(21) Appl. No.: 14/282,333

(22) Filed: May 20, 2014

(65) Prior Publication Data

US 2015/0139363 A1    May 21, 2015

(30) Foreign Application Priority Data

Nov. 19, 2013  (TW) .............................. 102142049 A

(51) Int. Cl.
*H04L 27/06*    (2006.01)
*H04L 27/152*   (2006.01)
*H04W 52/02*    (2009.01)

(52) U.S. Cl.
CPC ....... *H04L 27/1525* (2013.01); *H04W 52/0209* (2013.01)

(58) Field of Classification Search
CPC ............. H03D 3/00; H03D 3/18; H03K 7/06; H04B 1/00; H04B 1/16; H04B 1/18; H04B 1/38; H04B 1/69; H04B 1/707; H04B 15/00; H04L 25/06; H04L 27/00; H04L 27/10; H04L 27/12; H04L 27/14; H04L 27/22

USPC ........... 329/300, 304, 306; 348/528; 370/342; 375/130, 219, 272, 316, 317, 320, 323, 375/329, 330, 334, 336, 344; 381/312, 316; 455/63.1, 160.1, 161.3, 205, 318

See application file for complete search history.

(56) References Cited

U.S. PATENT DOCUMENTS

| 6,265,948 | B1 * | 7/2001 | Stevenson ..................... 332/101 |
| 7,994,851 | B2 * | 8/2011 | Byun et al. .................... 329/310 |
| 8,170,151 | B2 * | 5/2012 | Suzuki .......................... 375/334 |
| 2013/0195157 | A1 * | 8/2013 | Xu ................................ 375/219 |
| 2014/0140443 | A1 * | 5/2014 | Horng et al. .................. 375/320 |

OTHER PUBLICATIONS

Rong-Fu Ye "Highly Sensitive and Low Power Injection-Locked FSK Receiver for Short-Range Wireless Applications" 2012 IEEE.*

* cited by examiner

*Primary Examiner* — Sam K Ahn
*Assistant Examiner* — Shawkat M Ali
(74) *Attorney, Agent, or Firm* — Merchant & Gould P.C.

(57) ABSTRACT

A frequency-shift keying (FSK) receiver includes an injection-locking oscillating circuit to receive a FSK input signal, and a phase detecting circuit. The injection-locking oscillating circuit outputs a locked signal having a phase that tracks a phase of the FSK input signal. A difference between the phases of the FSK input signal and the locked signal is associated with a difference between a frequency of the FSK input signal and a free-running frequency of the injection-locking oscillating circuit. The phase detecting circuit receives the FSK input signal and the locked signal, and outputs a baseband logic signal according to the difference between the phases of the FSK input signal and the locked signal.

8 Claims, 5 Drawing Sheets

FREQUENCY-SHIFT KEYING RECEIVER

CROSS-REFERENCE TO RELATED APPLICATION

This application claims priority to Taiwanese Application No. 102142049, filed on Nov. 19, 2013.

BACKGROUND OF THE INVENTION

1. Field of the Invention

The invention relates to a receiver, and more particularly to a frequency-shift keying receiver.

2. Description of the Related Art

In application of a wireless sensor network, power consumption of sensors at each of network nodes is often a primary consideration, and the wireless transceiver is one of the major factors contributing to power consumption of the sensor.

Referring to FIG. 1, a conventional wireless receiver having direct conversion receiver architecture is shown to include a low noise amplifier (LNA) 11, two mixers 12, an oscillator 13 and two filters 14.

The LNA 11 receives and amplifies a frequency-shift keying (FSK) signal. The oscillator 13 provides two oscillator signals having a phase difference of 90 degrees therebetween. Each of the mixers 12 receives the amplified FSK signal and a respective one of the oscillator signals, and outputs to a respective one of the filters 14 one of an in-phase component and a quadrature component of the amplified FSK signal with a lower frequency by providing a down conversion function for subsequent processing.

However, such conventional architecture requires a stable and precise oscillator 13, resulting in higher difficulty and complexity in circuit design. Division of the FSK signal into the in-phase and quadrature (I/Q) components makes it difficult to reduce circuit elements, thereby resulting in a higher cost and higher power consumption.

SUMMARY OF THE INVENTION

Therefore, an object of the present invention is to provide a frequency shift keying receiver that may have relatively low power consumption.

According to the present invention, a frequency-shift keying (FSK) receiver comprises:

an injection-locking oscillating circuit disposed to receive a FSK input signal, and configured to output a locked signal having a phase that tracks a phase of the FSK input signal, a difference between the phases of the FSK input signal and the locked signal being associated with a difference between a frequency of the FSK input signal and a free-running frequency of the injection-locking oscillating circuit; and a phase detecting circuit disposed to receive the FSK input signal, coupled to the injection-locking oscillating circuit for receiving the locked signal, and configured to output a baseband logic signal according to the difference between the phases of the FSK input signal and the locked signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
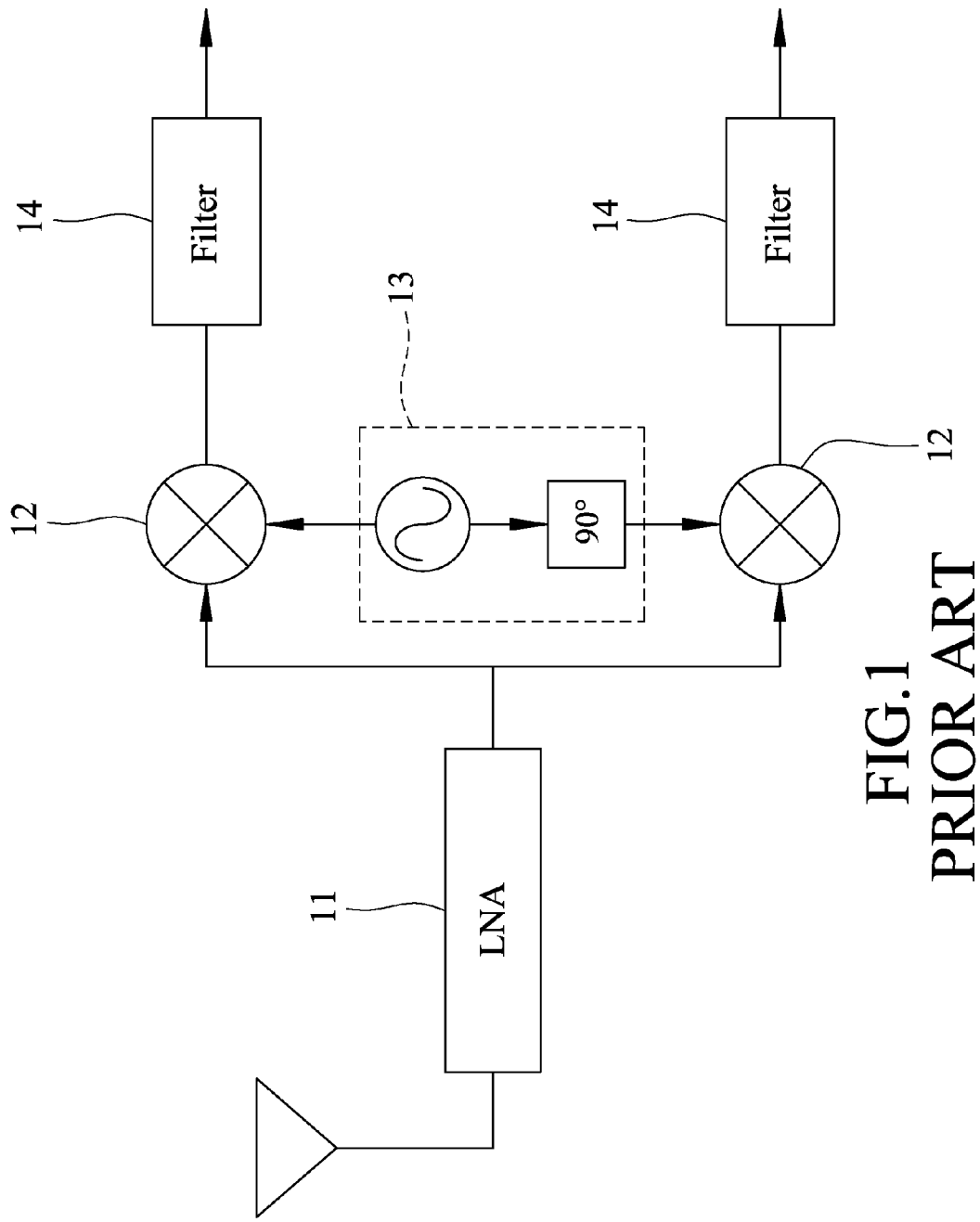
FIG. 1 is a block diagram illustrating a conventional FSK receiver.
Figure 2:
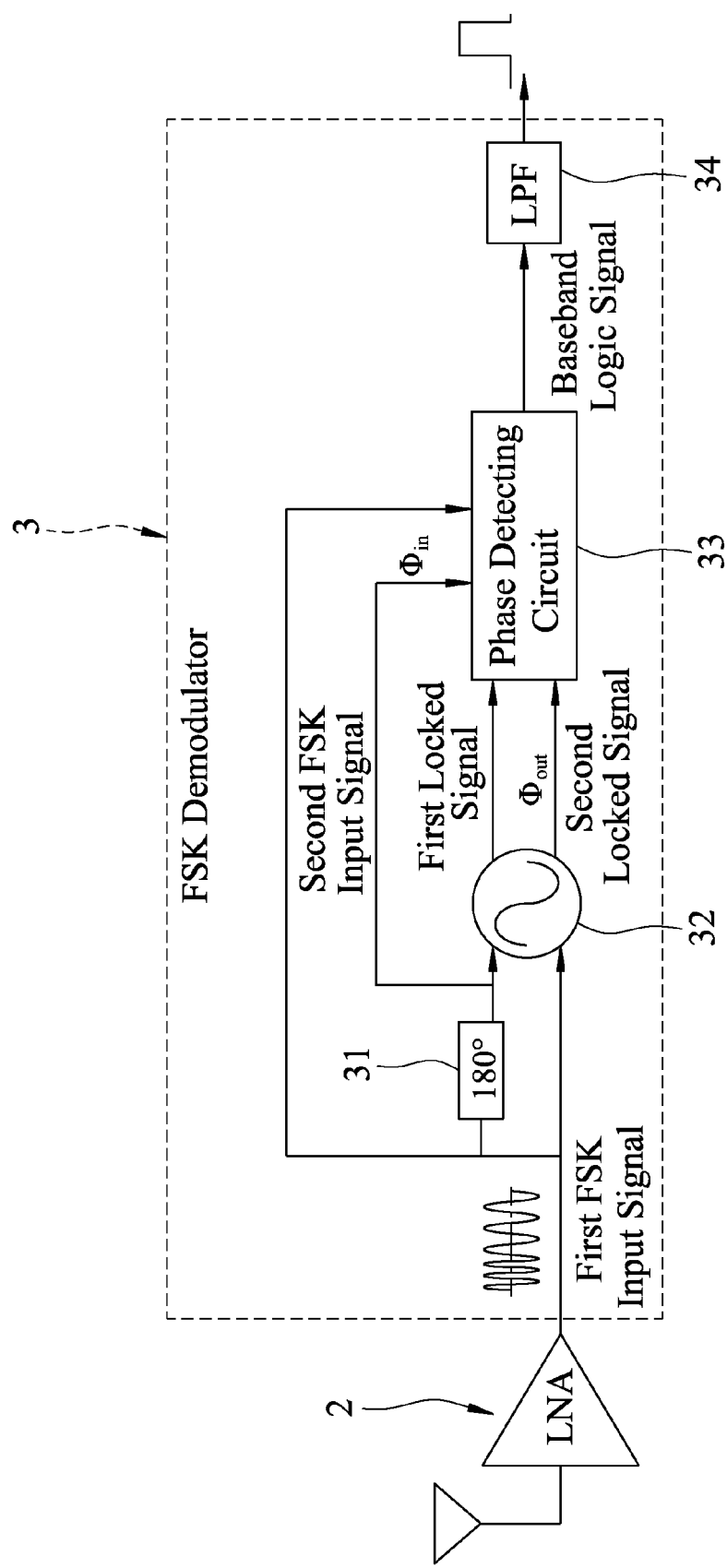
FIG. 2 is a block diagram illustrating a preferred embodiment of a frequency-shift keying device according to the present invention.

Referring to FIG. 2, the preferred embodiment of the frequency-shift keying (FSK) receiver according to this invention is shown to include a low noise amplifier (LNA) 2 and an FSK demodulator 3.

The LNA 2 receives and amplifies an FSK signal, and outputs an amplified FSK signal serving as a first FSK input signal of the FSK demodulator 3.

The FSK demodulator 3 includes a phase shifting circuit 31, an injection-locking oscillating circuit 32, a phase detecting circuit 33 and a low-pass filter (LPF) 34.

The phase shifting circuit 31 receives the first FSK input signal, and shifts a phase of the first FSK input signal by 180 degrees for outputting a second FSK input signal.

The injection-locking oscillating circuit 32 is coupled to the LNA 2 and the phase shifting circuit 31 for respectively receiving the first and second FSK input signals that form a differential signal (which is called an FSK input signal hereinafter), and outputs a first locked signal having a phase that tracks a phase of the first FSK input signal, and a second locked signal having a phase that tracks a phase of the second FSK input signal. That is, the first and second locked signals have a phase difference of 180 degrees therebetween, and form a differential signal (which is called a locked signal hereinafter). The injection-locking oscillating circuit 32 is configured to have a total phase shift of 0 degree when locked, and a difference between the phases of the FSK input signal and the locked signal is associated with a difference between a frequency of the FSK input signal and a free-running frequency of the injection-locking oscillating circuit 32. In detail, the locked signal has the phase lagging the phase of the FSK input signal when the free-running frequency of the injection-locking oscillating circuit 32 is higher than the frequency of the FSK input signal, and has the phase leading the phase of the FSK input signal when the free-running frequency of the injection-locking oscillating circuit 32 is lower than the frequency of the FSK input signal.

Figure 3:
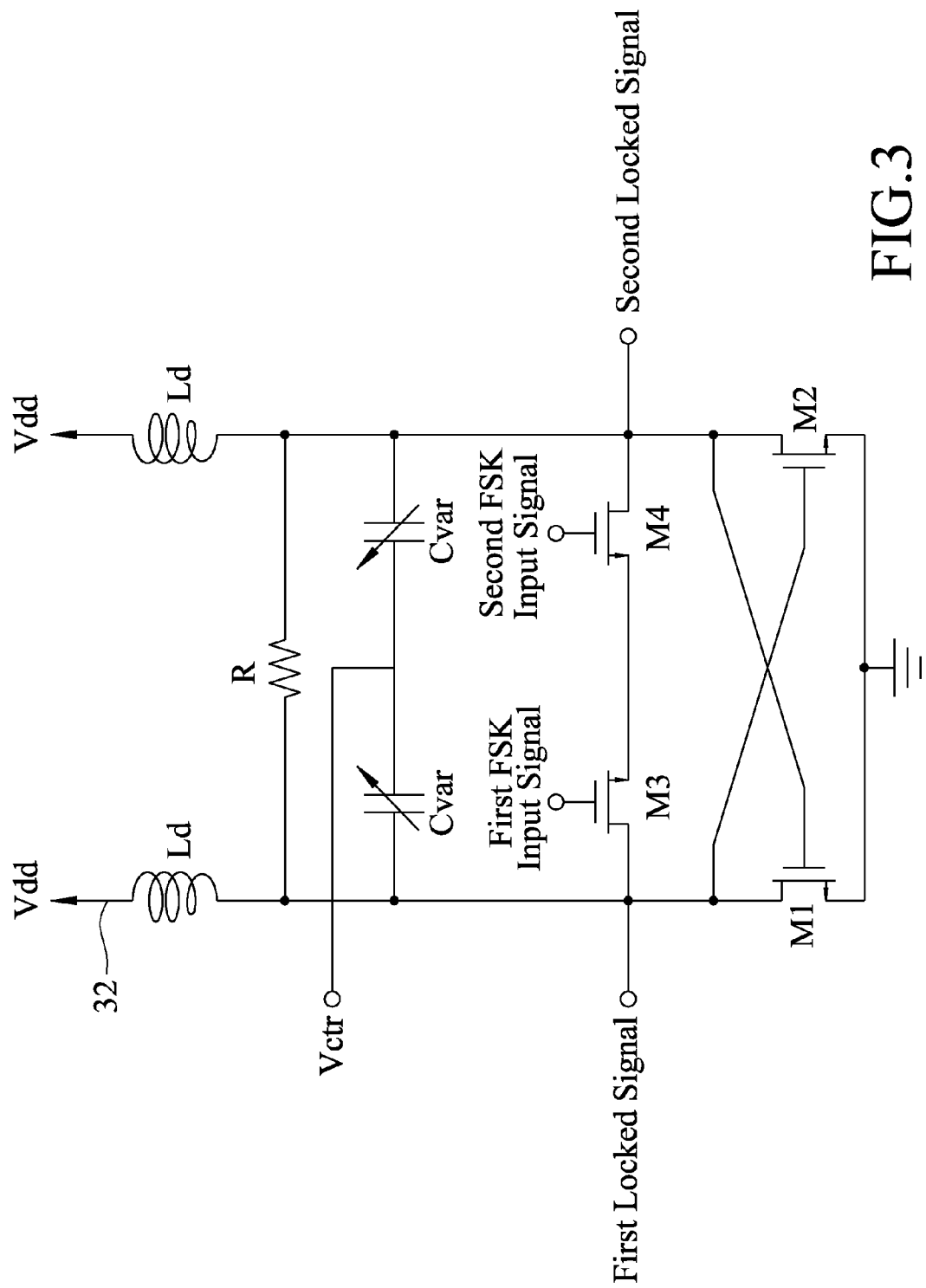
FIG. 3 is a schematic circuit diagram showing an injection-locking oscillating circuit of the preferred embodiment.

Referring to FIGS. 2 and 3, the injection-locking oscillating circuit 32 includes a first coupling transistor M1, a second coupling transistor M2, a first input transistor M3, a second input transistor M4, two capacitors Cvar coupled in series, a resistor R and a pair of inductors Ld.

The first coupling transistor M1 has a first terminal, a grounded second terminal, and a control terminal.

The second coupling transistor M2 has a first terminal coupled to the control terminal of the first coupling transistor M1, a grounded second terminal, and a control terminal coupled to the first terminal of the first coupling transistor M1.

The first input transistor M3 has a first terminal coupled to the first terminal of the first coupling transistor M1 and outputting the first locked signal, a second terminal, and a control terminal receiving the first FSK input signal.

The second input transistor M4 has a first terminal coupled to the first terminal of the second coupling transistor M2 and outputting the second locked signal, a second terminal coupled to the second terminal of the first input transistor M3, and a control terminal receiving the second FSK input signal.

In this embodiment, each of the transistors M1, M2, M3 and M4 is an N-type metal-oxide-semiconductor field-effect transistor (MOSFET) that has a drain terminal serving as the first terminal, a source terminal serving as the second terminal, and a gate terminal serving as the control terminal. In other embodiments, each of the transistors M1 to M4 may be another type of transistor, and the present invention should not be limited in this respect.

The capacitors Cvar are coupled in series between the first terminals of the first input transistor M3 and the second input transistor M4. In this embodiment, the capacitors Cvar are voltage-controlled variable capacitors that receive a control voltage Vctr at a common node thereof. Each of the capacitors Cvar has a capacitance that varies in response to the control voltage Vctr.

The resistor R is coupled between the first terminals of the first input transistor M3 and the second input transistor M4.

Each of the inductors Ld has a first terminal coupled to a voltage source Vdd, and a second terminal coupled to a respective one of the first terminals of the first input transistor M3 and the second input transistor M4.

Figure 4:
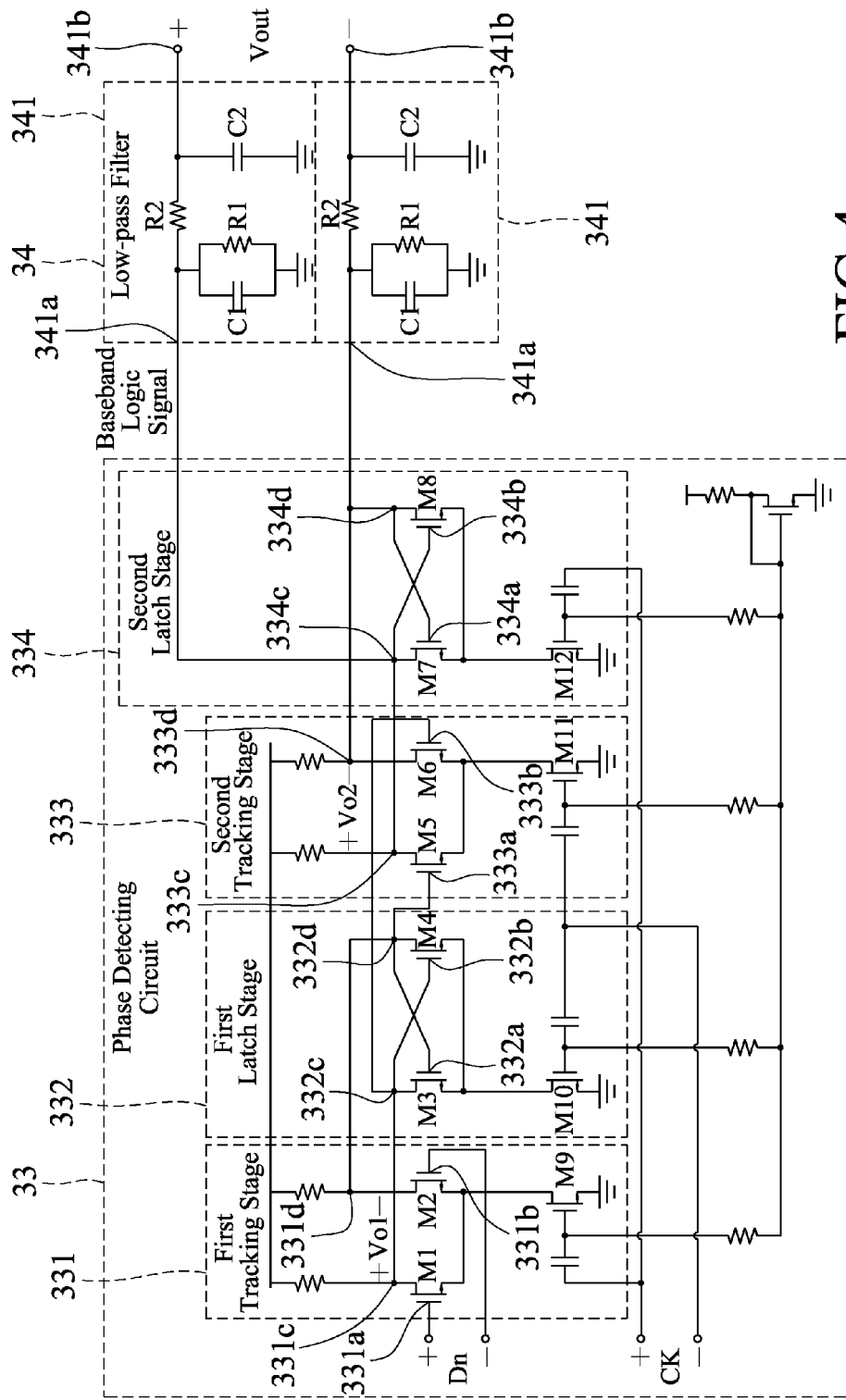
FIG. 4 is a schematic circuit diagram showing a phase detecting circuit and a low-pass filter of the preferred embodiment.

Referring to FIGS. 2 and 4, in this embodiment, the phase detecting circuit 33 is a current-mode D flip-flop coupled to the LNA 2, the phase shifting circuit 31 and the injection-locking oscillating circuit 32 for respectively receiving the first FSK input signal, the second FSK input signal and the locked signal, and outputs a baseband logic signal according to the difference between the phases of the FSK input signal and the locked signal. The first and second FSK input signals (i.e., the FSK input signal) serve as a data input signal Dn+/− of the current-mode D flip-flop, the locked signal serves as a clock signal CK+/− of the current-mode D flip-flop, and the baseband logic signal is an output signal of the current-mode D flip-flop. In this embodiment, the phase detecting circuit 33 is configured to output the baseband logic signal that has a first logic level (e.g., a logic low level) when the phase of the locked signal lags the phase of the FSK input signal, and that has a second logic level (e.g., a logic high level) when the phase of the locked signal leads the phase of the FSK input signal. In other embodiments, the phase detecting circuit 33 may be implemented using another type of flip-flop, and the present invention should not be limited in this respect.

Referring to FIG. 4, the phase detecting circuit 33 of this embodiment includes a first tracking stage 331, a first latch stage 332, a second tracking stage 333 and a second latch stage 334 that respectively include a first input terminal 331a/332a/333a/334a, a second input terminal 331b/332b/333b/334b, a first output terminal 331c/332c/333c/334c, a second output terminal 331d/332d/333d/334d, a pair of input transistors M1-M2/M3-M4/M5-M6/M7-M8, and a current transistor M9/M10/M11/M12. A voltage between the first and second output terminals 331c and 331d is defined as a first output voltage Vo1, and a voltage between the first and second output terminals 333c and 333d is the baseband logic signal Vo2.

The first and second input terminals 331a and 331b of the first tracking stage 331 respectively receive the first and second FSK input signals (i.e., the data input signal Dn+/−).

The first input terminal 332a of the first latch stage 332 is coupled to the second output terminals 331d and 332d. The second input terminal 332b of the first latch stage 332 is coupled to the first output terminals 331c and 332c.

The first and second input terminals 333a, 333b of the second tracking stage 333 are respectively coupled to the second output terminal 332d and the first output terminal 332c of the first latch stage 332.

The first input terminal 334a of the second latch stage 334 is coupled to the second output terminals 333d and 334d. The second input terminal 334b of the second latch stage 334 is coupled to the first output terminals 333c and 334c.

The LPF 34 receives the baseband logic signal Vo2 from the phase detecting circuit 33, and filters out high-frequency noise of the baseband logic signal Vo2 for outputting a filtered baseband logic signal Vout. The LPF 34 includes two filter modules 341. Each of the filter modules 341 includes a first resistor R1, a first capacitor C1, a second resistor R2 and a second capacitor C2.

The first resistor R1 and the first capacitor C1 are coupled in parallel between a ground node and a common node 341a thereof. The common node cooperates with the common node 341a of the other one of the filter modules 341 to receive the baseband logic signal Vo2.

The second resistor R2 has a first terminal coupled to the common node 341a of the first resistor R1 and the first capacitor C1, and a second terminal 341b.

The second capacitor C2 is coupled between the ground node and the second terminal 341b of the second resistor R2.

The second terminals 341b of the second resistors R2 of the filter modules 341 cooperate to output the filtered baseband logic signal Vout.

It should be noted that, in FSK modulation, binary 0 and 1 are represented using two different frequencies. The free-running frequency of the injection-locking oscillating circuit 32 must be configured to range between the aforesaid two different frequencies. Since such a technique is well-known to persons having ordinary skill in the art, details thereof are not described herein for the sake of brevity.

Referring to FIGS. 2 and 3, the capacitors Cvar, the resistor R and the inductors Ld form an LC resonance circuit, and the FSK input signals is injected into the LC resonance circuit. When the frequency of the FSK input signal is very close to the free-running frequency of the injection-locking oscillating circuit 32, the locked signal outputted by the injection-locking oscillating circuit 32 has the frequency locked to the frequency of the FSK input signal, and has the phase varying with the FSK input signal. Since the injection-locking oscillating circuit 32 has a frequency capture range inversely proportional to a Q factor (quality factor) thereof, the resistor R of the LC resonance circuit may be used to obtain a smaller Q factor, so as to promote the frequency capture range of the injection-locking oscillating circuit 32. Furthermore, by use of the voltage-controlled variable capacitors Cvar, the capacitances of the capacitors Cvar may be adjusted using the control voltage Vctr for adjustment of the free-running frequency of the injection-locking oscillating circuit 32, thereby promoting flexibility in application.

The relationship between the frequency capture range and the Q factor of the injection-locking oscillating circuit 32 is described as follows:

$$\omega_L \propto \frac{\omega_0}{2Q}$$

$$Q = \frac{\omega L}{R} = \frac{1}{\omega RC}$$

where $\omega_L$ is the frequency capture range, $\omega_0$ is the oscillating frequency of the injection-locking oscillating circuit 32, Q is the Q factor, ω is the oscillating frequency of the injection-locking oscillating circuit 32 without influence from external factors, R is the resistance of the resistor R, L is the inductance of the inductors Ld, and C is the capacitance of the capacitors Cvar.

Hereinafter, the phase of the FSK input signal is defined as $\Phi_{in}$, and the phase of the locked signal is defined as $\Phi_{out}$. Since the total phase shift of the injection-locking oscillating circuit 32 should be 0 degree, a change in $\Phi_{in}$ would result in a phase difference θ between $\Phi_{in}$ and $\Phi_{out}$. When the frequency of the FSK input signal falls within the frequency capture range, the injection-locking oscillating circuit 32 adjusts $\Phi_{out}$ to track $\Phi_{in}$ until the phase is locked. Since the locked signal has the phase $\Phi_{out}$ lagging the phase $\Phi_{in}$ of the FSK input signal when the free-running frequency of the injection-locking oscillating circuit 32 is higher than the frequency of the FSK input signal, and has the phase $\Phi_{out}$ leading the phase $\Phi_{in}$ of the FSK input signal when the free-running frequency of the injection-locking oscillating circuit 32 is lower than the frequency of the FSK input signal, the binary data contained in the FSK input signal may be obtained by identifying the phase difference θ between $\Phi_{in}$ and $\Phi_{out}$.

Figure 5:
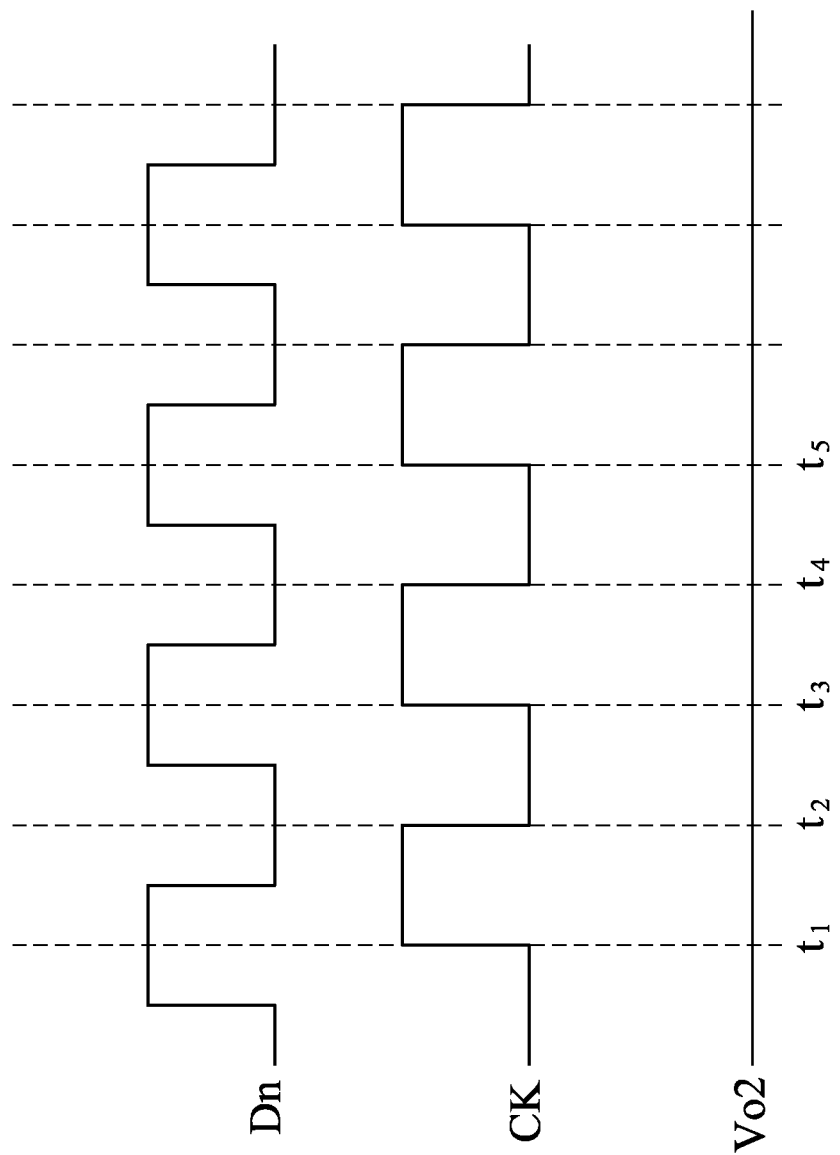
FIG. 5 is a waveform diagram of the phase detecting circuit of the preferred embodiment.

FIG. 5 is a waveform diagram to illustrate operation of the phase detecting circuit 33, where the phase $\Phi_{in}$ of the FSK input signal leads the phase $\Phi_{out}$ of the locked signal, and a default value of the baseband logic signal Vo2 is the logic low level. The following circuit operation is illustrated with reference to FIGS. 2, 4 and 5.

During a time period between t1 and t2, the clock signal CK (i.e., the locked signal) is switched to logic high. The transistors M9 and M12 conduct, and the transistors M10 and M11 do not conduct, such that the first tracking stage 331 is activated and the second tracking stage 333 is deactivated. As a result, the first output voltage Vo1 tracks the data input signal Dn (i.e., the FSK input signal).

During a time period between t2 and t3, the clock signal CK (i.e., the locked signal) is switched to logic low. The transistors M9 and M12 do not conduct, and the transistors M10 and M11 conduct, such that the first tracking stage 331 is deactivated and the second tracking stage 333 is activated. As a result, the first output voltage Vo1 is latched at the logic low level, and the baseband logic signal Vo2 tracks the first output voltage Vo1 to be at the logic low level.

During a time period between t3 and t4, the clock signal CK is switched once again to logic high. The transistors M9 and M12 conduct, and the transistors M10 and M11 do not conduct, such that the first tracking stage 331 is activated and the second tracking stage 333 is deactivated. As a result, the first output voltage Vo1 tracks the data input signal Dn (i.e., the FSK input signal).

During a time period between t4 and t5, the clock signal CK (i.e., the locked signal) is switched once again to logic low. The transistors M9 and M12 do not conduct, and the transistors M10 and M11 conduct, such that the first tracking stage 331 is deactivated and the second tracking stage 333 is activated. As a result, the first output voltage Vo1 is latched at the logic low level, and the baseband logic signal Vo2 tracks the first output voltage Vo1 to be at the logic low level.

Similarly, when the phase $\Phi_{in}$ of the FSK input signal lags the phase $\Phi_{out}$ of the locked signal, the baseband logic signal Vo2 has the logic high level.

The advantages of the preferred embodiment may be summarized as follows:

1. By virtue of the injection-locking oscillating circuit 32 and the phase detecting circuit 33, the precise oscillator and the mixers used in the aforementioned prior art may be omitted. Moreover, by using the phase detecting circuit 33 to process the first and second locked signals that have a phase difference of 180 degrees therebetween, it is not required to divide the FSK input signal into the in-phase component and the quadrature component for subsequent processing, thereby significantly reducing a number of circuit elements and circuit complexity, resulting in lower power consumption.

2. By using a parallel connected resistor in the LC resonance circuit to lower the Q factor, and by using the control signal Vctr to adjust the capacitance of the variable capacitors Cvar for adjustment of the free-running frequency of the injection-locking oscillating circuit 32, the frequency capture range of the injection-locking oscillating circuit 32 may be promoted, resulting in higher flexibility in application.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A frequency-shift keying (FSK) receiver comprising:
   an injection-locking oscillating circuit disposed to receive a FSK input signal, and configured to output a locked signal having a phase that tracks a phase of the FSK input signal, a difference between the phases of the FSK input signal and the locked signal being associated with a difference between a frequency of the FSK input signal and a free-running frequency of said injection-locking oscillating circuit;
   a phase detecting circuit disposed to receive the FSK input signal, coupled to said injection-locking oscillating circuit for receiving the locked signal, and configured to output a baseband logic signal according to the difference between the phases of the FSK input signal and the locked signal; and
   a phase shifting circuit disposed to receive a first FSK input signal, and configured to shift a phase of the first FSK input signal by 180 degrees for outputting a second FSK input signal, the FSK input signal received by said injection-locking oscillating circuit including the first FSK input signal and the second FSK input signal; the locked signal outputted by said injection-locking oscillating circuit including a first locked signal and a second locked signal that have a phase difference of 180 degrees therebetween;
   wherein said injection-locking oscillating circuit includes:
   a first coupling transistor having a first terminal, a grounded second terminal and a control terminal;
   a second coupling transistor having a first terminal coupled to said control terminal of said first coupling transistor, a grounded second terminal, and a control terminal coupled to said first terminal of said first coupling transistor;
   a first input transistor having a first terminal coupled to said first terminal of said first coupling transistor and outputting the first locked signal, a second terminal, and a control terminal receiving the first FSK input signal;
   a second input transistor having a first terminal coupled to said first terminal of said second coupling transistor and outputting the second locked signal, a second terminal coupled to said second terminal of said first input transistor, and a control terminal receiving the second FSK input signal;
   two capacitors coupled in series between said first terminals of said first input transistor and said second input transistor;

a resistor coupled between said first terminals of said first input transistor and said second input transistor; and a pair of inductors, each of which has a first terminal to be coupled to a voltage source, and a second terminal coupled to a respective one of said first terminals of said first input transistor and said second input transistor.

2. The FSK receiver as claimed in claim 1, wherein said injection-locking oscillating circuit is configured to output the locked signal that has the phase lagging the phase of the FSK input signal when the free-running frequency of said injection-locking oscillating circuit is higher than the frequency of the FSK input signal, and that has the phase leading the phase of the FSK input signal when the free-running frequency of said injection-locking oscillating circuit is lower than the frequency of the FSK input signal.

3. The FSK receiver as claimed in claim 2, wherein said phase detecting circuit is configured to output the baseband logic signal that has a first logic level when the phase of the locked signal lags the phase of the FSK input signal, and that has a second logic level when the phase of the locked signal leads the phase of the FSK input signal.

4. The FSK receiver as claimed in claim 3, further comprising:

a low-noise amplifier configured to receive and amplify an FSK signal, and to output the FSK input signal to said injection-locking oscillating circuit; and a low-pass filter configured to receive the baseband logic signal from said phase detecting circuit, and to filter out high-frequency noise of the baseband logic signal.

5. The FSK receiver as claimed in claim 4, wherein said low-pass filter includes two filter modules, each of which includes:

a first resistor and a first capacitor coupled in parallel between a ground node and a common node thereof, wherein said common node cooperates with said common node of the other one of said filter modules to receive the baseband logic signal;

a second resistor having a first terminal coupled to said common node of said first resistor and said first capacitor, and a second terminal; and a second capacitor coupled between the ground node and said second terminal of said second resistor, wherein said second terminals of said second resistors of said filter modules cooperate to output the baseband logic signal filtered by said low-pass filter.

6. The FSK receiver as claimed in claim 1, wherein said capacitors are voltage-controlled variable capacitors that are disposed to receive a control voltage at a common node of said capacitors, each of said capacitors having a capacitance that varies in response to the control voltage.

7. The FSK receiver as claimed in claim 1, wherein said phase detecting circuit is a current-mode D flip-flop, the FSK input signal serving as a data input signal of said current-mode D flip-flop, the locked signal serving as a clock signal of said current-mode D flip-flop, the baseband logic signal being an output signal of said current-mode D flip-flop.

8. A frequency-shift keying (FSK) receiver comprising:

a low-noise amplifier configured to receive and amplify an FSK signal, and to output an FSK input signal;

an injection-locking oscillating circuit coupled to said low-noise amplifier for receiving the FSK input signal, and configured to output a locked signal having a phase that tracks a phase of the FSK input signal, a difference between the phases of the FSK input signal and the locked signal being associated with a difference between a frequency of the FSK input signal and a free-running frequency of said injection-locking oscillating circuit;

a phase detecting circuit coupled to said low-noise amplifier for receiving the FSK input signal, coupled to said injection-locking oscillating circuit for receiving the locked signal, and configured to output a baseband logic signal according to the difference between the phases of the FSK input signal and the locked signal; and a low-pass filter coupled to said phase detecting circuit for receiving the baseband logic signal, and configured to filter out high-frequency noise of the baseband logic signal;

wherein:

said injection-locking oscillating circuit is configured to output the locked signal that has the phase lagging the phase of the FSK input signal when the free-running frequency of said injection-locking oscillating circuit is higher than the frequency of the FSK input signal, and that has the phase leading the phase of the FSK input signal when the free-running frequency of said injection-locking oscillating circuit is lower than the frequency of the FSK input signal;

said phase detecting circuit is configured to output the baseband logic signal that has a first logic level when the phase of the locked signal lags the phase of the FSK input signal, and that has a second logic level when the phase of the locked signal leads the phase of the FSK input signal;

said low-pass filter includes two filter modules, each of which includes:

a first resistor and a first capacitor coupled in parallel between a ground node and a common node thereof, wherein said common node cooperates with said common node of the other one of said filter modules to receive the baseband logic signal;

a second resistor having a first terminal coupled to said common node of said first resistor and said first capacitor, and a second terminal; and a second capacitor coupled between the ground node and said second terminal of said second resistor; and said second terminals of said second resistors of said filter modules cooperate to output the baseband logic signal filtered by said low-pass filter.

* * * * *